(12) United States Patent
Barnes

(10) Patent No.: US 8,586,817 B2
(45) Date of Patent: Nov. 19, 2013

(54) METHOD TO CONTROL ACID ROCK DRAINAGE

(71) Applicant: The Penn State Research Foundation, University Park, PA (US)

(72) Inventor: Hubert L. Barnes, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 13/741,968

(22) Filed: Jan. 15, 2013

(65) Prior Publication Data

US 2013/0129930 A1     May 23, 2013

Related U.S. Application Data

(62) Division of application No. 12/036,662, filed on Feb. 25, 2008, now Pat. No. 8,410,330.

(60) Provisional application No. 60/893,508, filed on Mar. 7, 2007.

(51) Int. Cl.
*A62D 3/36*     (2007.01)

(52) U.S. Cl.
USPC .......................................... 588/318; 588/901

(58) Field of Classification Search
USPC ............... 588/318, 405, 410, 901; 423/239.1, 423/242.1
See application file for complete search history.

(56) References Cited

U.S. PATENT DOCUMENTS

| 3,962,080 | A | 6/1976 | Dulin et al. |
| 4,314,966 | A | 2/1982 | Kleinmann |
| 5,616,251 | A | 4/1997 | Batarseh |
| 6,086,847 | A | 7/2000 | Thompson |
| 7,153,541 | B2 | 12/2006 | Elsetinow et al. |
| 2003/0209495 | A1 | 11/2003 | Schlegel |

FOREIGN PATENT DOCUMENTS

JP      18205054      8/2006

*Primary Examiner* — Edward Johnson
(74) *Attorney, Agent, or Firm* — Gifford, Krass, Sprinkle, Anderson & Citkowski, P.C.; Mark A. Harper

(57) ABSTRACT

A composition to control acid rock drainage is provided. The composition includes a slurry made from water and solids, the solids containing powders of limestone, clay and magnesium oxide or magnesium hydroxide. In some instances, the slurry is thixotropic and contains between 10 to 75 weight percent of solid powders. The solid powders can include between 40 to 75 weight percent limestone, 10 to 35 weight percent clay and 10 to 30 weight percent magnesium oxide or a proportional concentration of magnesium hydroxide.

10 Claims, No Drawings

METHOD TO CONTROL ACID ROCK DRAINAGE

CROSS REFERENCE TO RELATED APPLICATION

This application is a divisional application of U.S. application Ser. No. 12/036,662 filed on Feb. 25, 2008, which in turn claims priority of U.S. Provisional Patent Application Ser. No. 60/893,508 filed Mar. 7, 2007, both of which are incorporated herein by reference.

FIELD OF THE INVENTION

This invention relates generally to the control of acid rock drainage. More specifically, the invention relates to a composition and a method to control acid rock drainage, although the same procedure can be adapted for treating similar acidic industrial and agricultural drainage.

BACKGROUND OF THE INVENTION

Excavation into carbonate-free pyritic rock formations can occur, for examples, during construction of highways, large structure foundations, or mining of coal and/or metal ores. The exposure of the carbonate-free pyritic rocks to oxygen and water can lead to acidic pollution and subsequent harm to the environment. For example, the construction of Interstate 99 at the Skytop area in Pennsylvania and the Superfund site at the Bingham Canyon Copper Mine in Utah have resulted in acidic pollution into the environment, a contamination known as acid rock drainage (ARD). One example of the source of such pollution is shown by the following reaction wherein pyrite ($FeS_2$) or related iron sulfides, when exposed to water and oxygen, results in the formation of goethite (FeOOH) plus sulfate ions ($SO_4^{2-}$) and hydrogen ions ($H^+$).

$$2FeS_2 + 5H_2O + 7.5O_2 \Leftrightarrow 2FeOOH + 4SO_4^{2-} + 8H^+$$

The sulfate and hydrogen ions together represent sulfuric acid.

The ideal treatment of an excavation site is to exactly neutralize the acid produced by the weathering of pyrite and similar acid-generating minerals. However, in practice overtreatment, i.e. application of an excess amount of a composition, typically occurs. In the case of using a strong alkali-based type material, a caustic solution that can harm the surrounding environment can be formed. For example, lime kiln dust and bag house dust contain high concentrations of calcium oxide and/or hydroxide, that when supplied up to saturation of water runoff from pyrite rock and pyrite rock formations causes buffering of the pH up to near 12. Dilution of such a saturated solution by a large amount of neutral water, e.g. a ratio of 100:1 of neutral water to saturated water runoff, only decreases the pH from 12 down to near 10. A pH of 10 is still known to be highly caustic and above the range of 6-9 required for runoff by the Pennsylvania Sanitary Water Board and agencies of other states. In addition, although caustic waters do repress sulfate concentrations, leaching by such waters of aluminum, zinc and other metals from contacted rock materials can occur and further pollute any water runoff.

Therefore, there is a need to reduce and control the amount of pollution encountered when carbonate-free pyritic rocks are exposed to oxygen and water, as is common during excavation projects.

SUMMARY OF THE INVENTION

A composition to control acid rock drainage is provided. The composition includes a slurry made from water and solids, the solids containing powders of limestone, clay and magnesium oxide or magnesium hydroxide. In some instances, the slurry is thixotropic and contains between 10 to 75 weight percent of solid powders. The solid powders can include between 40 to 75 weight percent limestone, 10 to 35 weight percent clay and 10 to 30 weight percent magnesium oxide or a proportional concentration of magnesium hydroxide.

DETAILED DESCRIPTION OF THE INVENTION

The present invention has utility for controlling the pollution produced by reaction of water and oxygen with carbonate-free pyritic rocks, commonly known as acid rock drainage (ARD). The chemistry of the natural process that produces ARD is dependent upon simultaneous reactions of pyrite, or similar metallic sulfides such as marcasite, with both water and oxygen or other oxidants.

The weathering of pyrite occurs where it is exposed in rocks in near surface environments. Exposure of pyrite to rain and air or other oxidants produces acidic water, in particular water with relatively high concentrations of sulfuric acid via the reaction shown above. The present invention is used to control the acidity of water runoff resulting from the weathering of pyrite in carbonate-free pyritic rock formations by buffering the acidity to near neutrality. In particular the acidity of water runoff is typically held to pH values between about 6 and 9. In addition, the present invention may decrease sulfate concentrations of any water runoff to approximately 1 gram per liter by precipitation of $CaSO_4 \cdot 2H_2O$ or similar compounds. The present invention also has the capability of absorbing pollutants such as arsenic and trace metals by treating water runoff. As such, this invention minimizes the release of pollution from such reactions by using multiple processes.

The process and composition of the present invention slurry, and its rheological properties, especially as a thixotropic slurry, affords for the controlled penetration into rock and soil masses, and coating of contacted rock surfaces. For the purposes of the present invention, the term thixotropic is defined as that property of a substance, in particular its viscosity, changing as shear rate changes. Where flowing, the slurry has a lower viscosity favoring penetration of such rock and/or soil masses. When the composition of the present invention is applied as a slurry, the penetrating slurry coats pyritic rock surfaces, and favors forming an oxide layer containing iron and possibly sulfur, for example, that develops directly on the pyrite. The slurry coating and the oxide layer impedes and slows further any acid-forming reactions. As an alternative, the composition can be applied as a powder where water, e.g. from natural precipitation, is available to later wet and disperse the powder.

An optimum range of compositions for the present invention when applied as a slurry or as a powder includes clay, limestone and magnesium oxide or magnesium hydroxide, and affords for the proper treatment of pyrite and other compounds that react to release ARD. For the purposes of the present invention, clay is defined as a variety of phyllosilicate minerals rich in silicon and aluminum oxides and hydroxides which include variable amounts of structural water, illustratively including kaolinite, bentonite, dickite, halloysite, chrysotile, lizardite, amesite, talc, montmorillonite, beidellite, saponite, hectorite, sauconite, dioctahedral vermiculite, trioctahedral vermiculite, muscovite, paragonite, phlogopite, biotite, lepidolite, margarite, clintonite, anandite, donbassite, cookeite, sudoite, clinochlore, chamosite and nimite. The solid components of powder compositions that afford the present invention are hazard-free when released into the environment.

In one embodiment of the present invention, a slurry includes a mixture of water with powders of clay, limestone and magnesium oxide (MgO) or magnesium hydroxide (Mg(OH)$_2$). In some instances, the clay is kaolinite because of its widespread availability and comparatively low cost. In the alternative, other clays may be used depending upon their local availability and characteristics. The grain size of the limestone, clay and magnesium oxide powders can vary; however the powders can be between 200 mesh and 400 mesh in size. In some instances, the powders are less than 365 mesh. The term "mesh" is typically referred to as defining the number of holes per square inch in a screen or sieve. For example, the 200 mesh size refers to a screen or sieve with 200 holes per square inch and affords for a particle size equal to or less than 74 microns to pass through. A 400 mesh screen or sieve affords for a particle size equal to or less than 37 microns to pass through and a 325 mesh affords for a particle size less than or equal to 44 microns to pass through. Although other particle sizes are included in the present invention, the use of those disclosed herein affords for improved penetration and coverage of rocks, rock formations, and soils using a thixotropic slurry solution.

In contrast, the composition of the present invention controls the pH, where at saturation, treated water runoff from pyritic rock rises to pH levels between 6 to 9. As an example, a pH of 9 is mildly alkaline and similar to human ingestible products such as Milk of Magnesia®. In addition the slurry of the present invention depresses the concentration of sulfate, sulfite and many metals leached from rock formations, illustratively including chromium, lead, zinc, copper, manganese, titanium and the like. The sulfates and sulfites typically react with calcium from the slurry to form gypsum, hannebachite or with other alkalies or metals to form a variety of compounds. However, it should be noted that in the slurry, there is no deleterious armoring of the magnesium oxide, magnesium hydroxide or calcium carbonate powders by gypsum as has been found with limestone treatments.

The composition of the present invention can also be supplemented with other alkali mixtures illustratively including lime kiln dust and bag house dust for the purpose(s) of extending performance, reducing cost and the like. Furthermore, the selected slurry concentrations of the present invention, being thixotropic, affords for ready penetration of any open voids and channels among the rocks and soils to be coated. The increased penetration and coating of the pyrite rocks favors more effective armoring than that from reaction of pyrite surfaces to form a partial armoring by goethite. Both the slurry coating and the goethite layer slow the rate of pyrite oxidation and production of sulfuric acid.

The present invention includes a slurry with a range of compositions that afford low cost, thixotropic behavior and pH buffering capability. A range of compositions that fall within the present invention include between 40 to 75 weight percent (wt %) limestone, 10 to 35 wt % clay and 10 to 30 wt % magnesium oxide. Alternatively, magnesium hydroxide may replace the magnesium oxide if the concentration used is 1.45 times that listed for the oxide. As such, slurry would have 15 to 45 wt % magnesium hydroxide and the concentrations of the limestone and clay would be reduced proportionately. In addition, the slurry can initially contain 10 to 30 wt % magnesium oxide that reacts with water to form 15 to 45 wt % magnesium hydroxide.

In some instances, the composition of the present invention includes between 50 to 75 wt % limestone, 10 to 30 wt % clay and 10 to 25 wt % magnesium oxide. In other instances, the composition of the present invention includes between 60 to 75 wt % limestone, 10 to 20 wt % clay and 10 to 20 wt % magnesium oxide. Within this range of compositions buffering of water runoff from pyrite rock and pyritic rock formations is afforded. One example of the inventive composition includes 70.8 wt % limestone—16.7% kaolinite—12.5% MgO, which when in contact with water, the MgO chemically reacts with H$_2$O to form Mg(OH)$_2$ and provide a composition of 66.3 wt % limestone—15.6% clay—18.1% Mg(OH)$_2$.

A slurry including water and between 10 to 40 wt % solids of the composition of the present invention affords coating of pyrite rocks and pyrite rock formations. In the alternative, where treating a slope is required, a slurry with 60 to 75 wt % of solids of the composition of the present invention affords for pH buffering of water runoff, adequate coating of pyrite rock material and negligible flow of the slurry down the slope.

It is appreciated that the composition of the present invention affords for increased acid neutralization rates of acidic material when compared with the rate of acid neutralization of only limestone. In an effort to further illustrate the present invention, and yet in no way limit its scope, examples are described below.

EXAMPLES

Tank Testing

Three open to air, closed to rain concrete tanks were coated internally with an impermeable sealant, Conpro-Shield W (Conproco Corporation, Dover, N.H.) in order to prevent any reaction by the slurries and water runoff with the concrete. Each tank was filled with 9.1 metric tons of crushed aggregate from weakly mineralized Upper Ordovician Bald Eagle Graywacke. The characteristics of the crushed aggregate within each tank are shown below in Table 1.

TABLE 1

| Layer | Thickness | Rock Size |
| --- | --- | --- |
| Top layer | 31 cm (12 in) | 2A (100% <50 mm diameter) |
| Middle layer | 45.7 cm (18 in) | R3 (<15.2 cm diameter) |
| Lower layer | 41 cm (16 in) | 2A (100% <50 mm diameter) |
| Bottom layer | 5.1 cm (2 in) | Fine quartz sand |

Each tank had internal dimensions of 1.6 meters×3.2 meters×1.2 meters. The capacity of each tank was approximately 5.4 cubic meters, thereby allowing 9.1 metric tons of aggregate to be placed therein. Tank 1 had approximately 1.92 wt % pyrite, tank 2 had approximately 1.86 wt % pyrite and tank 3 had approximately 1.94 wt % pyrite. Testing was conducted on the aggregate in the three tanks in parallel so that direct comparisons of the results would be valid. Equivalent weights and concentrations of slurry were added to each tank at the same rates and times as closely as possible. In order to enhance penetration of the slurries into the aggregate, slurries were made from commercially readily available particle grain sizes of less than 325 mesh. The slurries were introduced by gravity flow from 55 gallon pump filled barrels mounted on top of the tanks. Each slurry was prepared using spring water and was stirred in the barrels by a low speed electric outboard trolling motor. The spring water had a pH of 7.38 with 95.9 mg/liter calcium, 11.5 mg/liter magnesium and 194 mg/liter sulfates.

Each slurry was dispersed across the top area of each tank initially through a grill of perforated plastic pipes but later by a sprinkler that covered areas about 38 centimeters in diameter. Thus, by moving the sprinkler to six different uniformly spaced sites on the top of each tank for timed intervals, a nearly uniform distribution was obtained. Water samples taken for analysis and for on site pH measurements and conductance measurements were taken from each tank at the same times and in similar small amounts. These samples were collected through plastic valves at the front bottom of each tank.

The cumulative time, volume of slurry or water applied to each tank, whether or not valving for the tank was open to allow drainage or closed to prevent drainage and corresponding pH values for water samples taken from each tank are shown in Table 2 below.

TABLE 2

| | Conditions | | Drain Sample pH | | |
|---|---|---|---|---|---|
| # Days | Slurry/ Additions | Flow System | Tank 1 Bauxsol™ | Tank 2 Mg(OH)$_2$ | Tank 3 Limestone |
| 0 | 0/0 | | | | |
| 1 | 0/284 liters water (75 gal) | open | 3.70 | 3.70 | 3.70 |
| 9 | 0/284 liters water (75 gal) | open | 2.84 | 3.18 | 2.83 |
| 17 | 0/drain tanks | | 3.96 | 3.78 | 4.05 |
| 17 | 4 wt % solids/ 208 liters (55 gal) | open | 4.20 | 7.13 | 6.48 |
| 18 | 4 wt % solids/ 208 liters (55 gal) | open | 4.33 | 8.48 | 6.92 |
| 19 | | | 3.78 | 8.16 | 6.76 |
| 20 | 8 wt % solids/ 208 liters (55 gal) | open | 6.10 | 8.80 | 6.40 |
| 21 | 8 wt % solids/ 757 liters (200 gal) | closed | 4.20 | 7.10 | 5.30 |
| 22 | | | 3.80 | 6.30 | 4.10 |
| 23 | | | 3.80 | 6.70 | 3.96 |
| 24 | | | 3.55 | 7.06 | 3.71 |
| 25 | | | 3.77 | 6.04 | 3.83 |
| 28 | | | 3.98 | 5.90 | 3.80 |
| 29 | | | 4.06 | 5.80 | 3.80 |
| 30 | | | 3.80 | 6.20 | 4.00 |
| 31 | | | 3.84 | 5.80 | 3.87 |
| 32 | | | 4.06 | 7.00 | 4.10 |
| 33 | 0/189 liters water (50 gal) | mostly open | 4.04 | 6.50 | 4.10 |
| 34 | | | 4.08 | 6.35 | 4.09 |
| 35 | | | 3.86 | 6.31 | 3.94 |
| 36 | | | 3.84 | 6.27 | 3.88 |
| 37 | 0/drain 3 tanks | fully open | 3.73 | 7.50 | 5.15 |
| 38 | | | 4.12 | 7.80 | 6.20 |
| 39 | | | 5.15 | 7.80 | 6.40 |
| 40 | | | 4.70 | 8.10 | 7.30 |
| 42 | | | 5.84 | 8.00 | 8.00 |
| 46 | | | 7.56 | 7.91 | 8.23 |
| 50 | | | 7.81 | 7.70 | 8.10 |
| 56 | 0/filled with spring water | | 4.57 | 8.10 | 7.6 |
| 57 | 0/drain 3 tanks | open | | | |
| 607 | (Δ 18.1 months) | open | 4.43 | 9.31 | 4.64 |
| 607 | 30 min. later | open | 4.44 | 9.32 | 4.72 |
| 622 | | open | 4.17 | 8.71 | 4.30 |
| | samples from rear trough | | 3.72 | 7.00 | 5.65 |
| 629 | | open | 3.69 | 8.58 | 3.04 |
| | samples from rear trough | | 3.11 | 8.12 | 5.36 |
| 652 | Σ 21.5 months | open | 3.89 | 8.93, 8.73 | 3.91, 3.67 |
| | samples from rear trough | | — | 8.99 | 4.50 |

As shown in column 2 of Table 2 for day 1, no slurry was added but 284 liters (75 gal) of clean spring water was applied to each tank. In addition, the valving for the tank was in the open position such that the water could drain through. Thereafter, the aggregate in each tank was washed further with an additional 284 liters (75 gal) on day 9. The first slurry was added on day 17 with water containing 4 wt % of solids applied to each tank. The first tank had a slurry made from Bauxsol™, the second tank was treated with a slurry made from magnesium hydroxide and the third tank was treated with a slurry made from powdered limestone. The composition of Bauxsol™ varies depending upon its source with a typical composition being 30 wt % hematite, 19% gibbsite, 14% sodalite, 11% goethite, 8% rutile, 5.4% anatase, 4.1% halite, 3.8% calcite, 1.7% quartz and 1.4% boehmite. The slurry concentrations were doubled to 8 wt % for addition on days 20 and 21, after which the valving for the tanks was closed. On day 33, more water was added in order to keep all of the aggregate wet in each tank while draining was allowed to occur until day 37 when the tanks were completely drained. After day 37, pH measurements were obtained on slow draining residual samples up to and after the tanks were washed on day 57. After day 57, the tanks were undisturbed and protected from rain while air continued to easily penetrate from the exposed top surfaces down through the moist aggregate. After day 607, the covers of the tanks were removed and from day 607 to day 652 the aggregate was exposed to a normal rainfall of 11.6 centimeters.

As shown in Table 2, the initial treatment in tank 1 with the 4 wt % Bauxsol™ was insufficient for buffering the pH of water drainage therefrom. Even doubling the concentration to 8 wt % solids was adequate to raise the pH towards neutrality for only one day (day 20). Thereafter, the pH of water draining through tank 1 persisted at acidic levels near 4 until days 42-50 where the pH for small volumes of residual water left in the drain tank was buffered to neutrality by the remaining amount of Bauxsol™. Nevertheless, further addition of spring water on day 56 decreased the pH back to near 4 for the remaining 596 days of the test.

The effective neutralization of acid by the magnesium hydroxide in tank 2 is clearly shown in the Table 2. From the first treatment with the magnesium hydroxide on day 17 through the entire test, the pH remained monotonic and effectively neutral between 6 and 9. The total amount of magnesium hydroxide added to tank 2 was approximately 70% of that required to stoichiometrically neutralize all of the acid that could be released by complete oxidation of the pyrite in the tank. Thus the fact that the magnesium hydroxide buffering was able to maintain neutrality demonstrates that much of the pyrite in the aggregate did not oxidize during the 21½ months of testing. Examination of the pyritic material within the aggregate demonstrated that goethite armoring was common of the pyrite and that the goethite apparently retarded the oxidation process leaving unreacted pyrite cores. Not being bound by theory, the mere neutral to slightly alkaline conditions maintained by the magnesium hydroxide were ideal for the forming of goethite armor around the pyrite.

Regarding tank 3 which was treated with the limestone slurry, both the 4 wt % treatment and the 8 wt % treatment held the pH above 6 temporarily for 4 days. Thereafter, the pH faded to 5.3 and then near 4 for 15 days. As with tank 1, draining of the tank helped the remaining limestone to buffer the small volume of residual water to near neutral pH. The buffering continued during refilling of the tank with clean water, however after draining and again during later inflow of rainfall, the pH remained acidic at approximately 4.4. It is appreciated that the pH increased slightly while the tank was draining and decreased when the outflow was limited or stopped, as shown on days 20 versus 21 and days 36 versus 37. This less than adequate buffering is implicit in the alteration mineralogy where the limestone, not the pyrite, becomes clearly armored.

The tank tests demonstrate unequivocally that the limestone slurry becomes unreactive in a relatively short time period when compared to the magnesium hydroxide slurry that remained effective at buffering the pH to near neutrality. These improved and unexpected results for the inventive slurry also demonstrate that much greater but uncertain quantities of limestone are required to achieve the same degree of neutralization of ARD when compared to quantities of the inventive slurry to produce the same effect.

Column Testing

Plastic columns containing nominally 50 lbs of 2A-size (<0.5 inches) non-carbonate aggregate with 5 wt % pyrite were used to determine the comparative degree of penetration of the limestone and inventive slurries through the aggregate and the extent of coating of rock surfaces in slowing the generation of acid. Initially, a clean water wash was passed through each column, followed by treatment with one of the two slurries shown in Table 3 with differing concentrations of weight percent solids. All slurry solids were nominally 325 mesh size. During times between washes and treatments, air could easily penetrate the columns thereby furthering the rates of pyrite oxidation and the production of ARD, thereby creating a severe test of the two treatment materials. The columns were monitored for penetration of the aggregate by the slurry solids and for changing pH values for the outflows after multiple washes with clean water. The results are shown in Table 3.

Prior to any treatments, the outflow due to pyrite oxidation in the columns was very acid at pH 1.6-3.8. After treatment, the acid was neutralized and remained so for at least 3 days by the limestone slurry and at least 46 days by the inventive slurry. The inventive slurry at concentrations of about 27-36 wt % solids was very effective in penetrating and coating the aggregate and buffering to near neutrality. The rheological behavior of that slurry which is thixotropic, is crucially important for controlling the excellent penetration and coating of the aggregate; the limestone slurry, not being thixotropic, was not effective at coating the aggregate.

TABLE 3

| | | | Slurry Treatments | | | |
|---|---|---|---|---|---|---|
| Test No. | Wt % Solids | Pretreatment Initial pH | First pH | No. Days | Final pH | Penetration + Coating |
| Inventive Slurry | | | | | | |
| 4-2 | 36.3 | 1.6 | 9.3 | 46 | 6.3 | Excellent |
| 2-3A | 32.7 | — | 9.2 | 13 | 7.7 | Mediocre |
| 2-3B | 26.8 | 3.8 | 9.15 | 6 | 7.7 | Excellent |
| 3-3 | 10.7 | — | — | 24 | 7.8 | good, poor as wet solids |
| Limestone | | | | | | |
| 3-1 | 44.9 | 3.2 | — | — | — | penetration good coating poor |
| — | 51.9 | — | — | — | — | both poor |
| 2-4 | 30.0 | — | — | 3 | 7.0 | poor as wet solids |

For that reason, treatment by the limestone slurry should not be expected to be as effective as the inventive slurry in slowing both the rate of pyrite oxidation and of the generation of ARD.

Additional Testing

Table 4 shows the pH of water runoff for a given slurry composition applied to rock aggregate. In addition, how well a particular slurry composition performed as a coating on the rock aggregate is shown. Using limestone alone did not provide adequate pH buffering of water runoff. Bentonite clay has no buffering capability and was tested for coating performance only. In contrast, slurries with compositions falling within the present invention (limestone+clay+magnesium oxide or hydroxide) buffered the pH of water runoff to between 7 and 9. In particular, a slurry containing 36.3 wt % of solids, with the solids comprised of 54 wt % limestone—17% Kaolinite—29% $Mg(OH)_2$ maintained a buffered pH between 6 and 9 even after exposure to 58% of the average annual precipitation for the local area in a time period of 46 days (see results for col. 4-2). In addition, this slurry composition, along with other compositions that fall within the present invention, exhibited excellent coating of the rock aggregate.

TABLE 4

| Test | Slurry Components (all 325 mesh powders) | Total Wt % | pH (change after washes) | Coating of Materials |
|---|---|---|---|---|
| tank 3 | Limestone | 8 | after 18 days, 4.08 | none |
| col. 3-1 | Limestone | 44.9 | — | very good |
| col. 3-1 | Limestone | 51.9 | — | poor |
| tank 2 | $Mg(OH)_2$ | 8 | after 18 days, 6.43 | none |
| col. 2-2 | $Mg(OH)_2$ | 26.5 | — | excellent |
| col. 2-1 | $Mg(OH)_2$ | 41.9 | — | poor |
| col. 2-2 | $Mg(OH)_2$ | 48.8 | — | poor |
| col. 4-1 | bentonite clay | 3.3 | — | none |
| col. 4-1 | bentonite clay | 6.3 | — | none |
| col. 4-1 | bentonite clay | 9.2 | — | poor |
| col. 4-1 | bentonite clay | 11.9 | — | very good |
| col. 4-0 | bentonite clay | 41.6 | — | none |
| col. 3-2 | lms + bentonite + $Mg(OH)_2$ 0.42:0.42:0.16 | 23.9 | after 6 washes, 9.0 → 8.6 | excellent |
| col. 4-2 | lms + kaolinite +30 $Mg(OH)_2$ 0.54:0.17:0.29 | 36.3 | after 46 days, 58% of annual ppt., 9.3 → 7.0 | excellent |
| col. 2-3A | lms + kaolinite + $Mg(OH)_2$ 0.41:0.37:0.22 | 32.7 | after 2 days, 9.2 → 7.7 | mediocre |
| col. 2-3B | lms + kaolinite + $Mg(OH)_2$ 0.54:0.17:0.29 | 26.8 | after 6 days, 9.2 → 7.7 | excellent |
| col. 3-3 | lms + kaolinite + $Mg(OH)_2$ 0.71:0.17:0.12 | 10.7 | after 4 days, 7.8 | good |

Turning now to Table 5, a series of tests were performed to further demonstrate the coating capability of compositions of the present invention. Various rock aggregates were sprayed with slurries containing a range of solid concentrations. As shown in Table 4, slurries with a wt % of solids ranging from 23.9 wt % to 36.3 wt % afforded excellent penetration of the rock aggregate and good-excellent coating of grains of the rock aggregate material. Thus Tables 3, 4 and 5 identify for best penetration and coating a preferred concentration of the slurry between 10 to 40 wt % solids and 90 to 60 wt % water. Preferably, the composition has 25 to 30 wt % solids.

TABLE 5

Penetration of Piles and Coating of Grains

| Weight % Solids | Material to be Treated | Penetration by the Slurry | Coating of Grains of the Material |
|---|---|---|---|
| 10.8 | various crushed rock sizes | thorough penetration | none |
| 15 | sand type A, 14 mesh (<1.4 mm) lms | none | none |
| 15 | type 6S, size 8 (<2.36 mm) lms | good | good |
| 23.9 | 2A aggregate (<19 mm) lms | excellent | excellent |
| 25 | type 6S, size 8 (<2.36 mm) lms | excellent | excellent |
| 26.8 | 2A aggregate (<19 mm) lms | excellent | excellent |
| 30 | 2A aggregate (<19 mm) lms | excellent | excellent |
| 32.7 | 2A aggregate (<19 mm) | slow | good |
| 36.3 | (>2 cm) | excellent | good |

In addition to compositions which provide a capability to coat acid source minerals and to buffer the acidity of water runoff, tested also was their ability to be retained on surfaces with a slope. Slurries with varying wt % of solids were sprayed onto surfaces with varying degrees of slope. As shown in Table 6, slurries containing up to 70 wt % of solids provided good to excellence coatings in the laboratory tests or in field test at a location named "Skytop." However, for surfaces with slopes between 23-30°, slurries containing 60 to 70 wt % solids were needed to prevent excessive flow rates of the slurry down the surface. In summary, a slurry with a wt % solids between 60 to 70 percent can be sprayed onto a sloped surface and afford for excellent coating of rock formations containing pyrite and yet retain sufficient viscosity that the slurry is not lost or wasted by flowing down a slope. An optimum concentration of the slurry is near 70 wt % solids for treatments on slopes.

TABLE 6

| Weight % Solids | Coating on #8 Lms Surface Particles (<1 cm) in Lab or on Skytop fill | Flow Rate on Slopes |
|---|---|---|
| 27 | complete in lab tests | on 12° slope: minor<br>on 23° slope: slight<br>on 43° slope: excessive |
| 30 | good on sections 1, 4, and 5 at Skytop | on 23-30° slopes: excessive |
| 60 | excellent on sections 1, 4, and 5 at Skytop | on 23-30° slopes: very minor |
| 60 | excellent in lab tests | on 30° slope: small, passable |
| 70 | excellent in lab tests, fills between grains | on 30° slope: negligible |
| 75 | incomplete in lab tests (doesn't gravity flow even on steep slopes) | on 30° slope: none (too viscous to pump spray) |
| 80 | poor in lab tests (too rigid) | on 30° slope: none (too viscous to pump spray) |

It is appreciated that the composition ranges of the present invention can also include other incidental additives known to those skilled in the art. Furthermore, the present invention includes a method for controlling acid rock pollution, said method comprising applying a slurry of the compositions provided herein onto carbonate-free pyritic rocks and/or applying a powder mixture of a composition disclosed herein onto carbonate-free pyritic rocks when water in the form of rain or water provided in some other manner is available. It is also appreciated that the composition and method disclosed in the present invention has utility for controlling any type of pollution wherein the neutralization of acidic material is desired, illustratively including the neutralization of industrial waste.

It is to be understood that various modifications are readily made to the embodiments of the present invention described herein without departing from the spirit and scope thereof. Accordingly, it is to be understood that the invention is not to be limited by the specific illustrated embodiments but by the scope of the appended claims.

I claim:

1. A process for controlling acid rock drainage from carbonate-free pyritic rock formations, the process comprising:
   providing water;
   providing solids in the form of powders of limestone, separate powders of clay and separate powders of magnesium oxide;
   mixing the water and the solids to form a slurry having a solids content between 10 to 75 wt % with between 40 to 75 wt % of the limestone powders, 10 to 35 wt % of the separate clay powders and 10 to 30 wt % of the separate magnesium oxide powders;
   allowing the magnesium oxide powders to react with the water to form 15 to 45 wt % of separate magnesium hydroxide powder in the slurry; and
   applying the slurry to carbonate-free pyritic rock formations.

2. The process of claim 1, wherein the slurry contains between 10 to 40 wt % of the solids.

3. The process of claim 1, wherein said slurry contains between 60 to 75 wt % of the solids.

4. The process of claim 1, wherein the slurry is thixotropic.

5. The process of claim 4, wherein the slurry is sprayed onto a rock pile.

6. The process of claim 4, wherein the slurry is sprayed onto a surface having a slope of less than 20°.

7. The process of claim 4, wherein the slurry is sprayed onto a surface having a slope of greater than 20°.

8. The process of claim 1, wherein the powders of limestone, powders of clay and powders of magnesium oxide or magnesium hydroxide have a nominal size of between 200 mesh and 400 mesh.

9. The process of claim 8, wherein said powders of limestone, powders of clay and powders of magnesium oxide or magnesium hydroxide have a nominal size of between 325 mesh and 400 mesh.

10. The process of claim 1, wherein the clay powders contain kaolinite.

\* \* \* \* \*